(12) United States Patent
Wallace et al.

(10) Patent No.: US 9,714,142 B1
(45) Date of Patent: Jul. 25, 2017

(54) BELT TRACKING DEVICE AND SYSTEM

(71) Applicant: HYTROL CONVEYOR COMPANY, INC., Jonesboro, AR (US)

(72) Inventors: Paul D. Wallace, Bono, AR (US); Bobby M. Brown, Jonesboro, AR (US); Jim Greuel, Jonesboro, AR (US)

(73) Assignee: HYTROL CONVEYOR COMPANY, INC., Jonesboro, AR (US)

( * ) Notice: Subject to any disclaimer, the term of this patent is extended or adjusted under 35 U.S.C. 154(b) by 0 days.

(21) Appl. No.: 15/089,164

(22) Filed: Apr. 1, 2016

(51) Int. Cl.
*B65G 15/64* (2006.01)
*B65G 15/62* (2006.01)
*B65G 39/16* (2006.01)

(52) U.S. Cl.
CPC ............ *B65G 15/64* (2013.01); *B65G 15/62* (2013.01); *B65G 39/16* (2013.01)

(58) Field of Classification Search
CPC ......... B65G 15/62; B65G 15/64; B65G 39/16
USPC .................................................. 198/840, 841
See application file for complete search history.

(56) References Cited

U.S. PATENT DOCUMENTS

| | | | |
|---|---|---|---|
| 2,633,977 A * | 4/1953 | McMillan ............ | B65G 23/44 198/815 |
| 3,753,488 A * | 8/1973 | Wilson ................ | B65G 23/44 187/404 |
| 3,938,721 A * | 2/1976 | Staneck ............... | B41J 11/30 226/75 |
| 3,972,414 A * | 8/1976 | Conrad ............... | B65G 39/071 198/808 |
| 4,811,496 A * | 3/1989 | Honda ................ | F26B 3/20 198/840 |
| 4,917,232 A * | 4/1990 | Densmore ........... | B65G 39/16 198/808 |
| 5,022,166 A * | 6/1991 | Nguyen ............... | F26B 13/007 242/615.11 |
| 5,782,340 A * | 7/1998 | Dolan ................. | B65G 17/086 198/840 |
| 6,053,832 A * | 4/2000 | Saito .................. | F16H 7/18 198/840 |
| 6,062,377 A * | 5/2000 | Mensch ............... | B65G 15/60 198/811 |
| 6,390,289 B1 * | 5/2002 | Hoggan ............... | B65G 15/08 198/806 |
| 8,837,989 B2 * | 9/2014 | Yasumoto ........... | G03G 15/161 198/840 |
| 2006/0131138 A1 * | 6/2006 | Eberle ................ | B65G 15/64 198/841 |

FOREIGN PATENT DOCUMENTS

DE     3641809 A1 *  6/1988  ............ B65G 15/02

* cited by examiner

*Primary Examiner* — Mark A Deuble
(74) *Attorney, Agent, or Firm* — Schrantz Law Firm, PLLC; Stephen D. Schrantz

(57) ABSTRACT

The belt tracking guide provides a stationary device that secures to a side rail of the conveyor system. The belt of the conveyor system travels between the two rails to transport objects through the conveyor system. The guides attach to the side rails allowing the belt to travel adjacent the guides. Each guide provides an upper guide finger and a lower guide finger. The guide fingers form a guide aperture located between the fingers. The belt travels through the guide apertures between the guide fingers. The guide finger redirects the belt away from the guide to center the belt.

17 Claims, 9 Drawing Sheets

BELT TRACKING DEVICE AND SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention is directed to conveyor systems, and more particularly, to a system for guiding the belt in a conveyor system.

II. Description of the Known Art

Conveyor systems transport goods, packages, cartons and other objects in all types of environments and experience heavy use in the manufacturing and shipping industries. Complex conveyor systems typically require several conveyor lines and lanes that cooperate with one another to transport or sort objects, as well as various peripheral devices that are associated with each conveyor lane (e.g., sensors, solenoids, motors, etc.).

The tracking of a conveyor belt may depend on how the precision with which the belt is manufactured. However, without a tracking mechanism, a conveyor belt will typically track to the left or to the right after usage. The belt may rub against the conveyor system due to the tracking to the left or right. This rubbing often leads to conveyor noise, conveyor belt wear, and conveyor belt failure.

Maintaining the alignment of conveyor webs or belt shaped materials over rollers or pulleys has been a universal problem. Solutions for improving the realignment rate of tracking rollers have not been significant. One approach to solving the problem has been to use some type of limiter to urge the belt in a certain direction once the belt has moved to a limit position. Although this approach can be helpful in quickly correcting a misaligned belt, the limiter can damage the edges of the belt or the material travelling over the rollers. Another approach has been to increase the angle at which the grooves or ribbing are aligned with respect to the circumference of the roller. By increasing the angle at which the helical grooves or ribbing track inward, the speed at which the belt tracks inward can be increased. However, tracking speed can only be increased a limited amount with this approach because once the angle becomes too great the grooves approach being perpendicular to the direction of the belt across the roller, which can result in a loss of all tracking ability.

SUMMARY OF THE INVENTION

The belt tracking guide of the present invention provides a stationary device that secures to a side rail of the conveyor system. In one embodiment, the conveyor system provides two side rails. The belt travels between the two rails to transport objects through the conveyor system. The guides attach to the side rails allowing the belt to travel adjacent the guides.

Each guide provides an upper guide finger and a lower guide finger. The guide fingers form a guide aperture located between the fingers. The belt travels through the guide apertures between the guide fingers. As the belt tracks to the left or the right, the belt contacts at least one of the guide fingers. The guide fingers are sloped to direct the belt away from the contacted guide. The guides contact the belt to direct the belt away from the guide to center the belt. As the belt tracks laterally, the belt contacts a guide finger. The guide finger redirects the belt away from the guide to center the belt.

A guide body of the guide attaches to the rails to secure the guide fingers for contacting the belt. The guide fingers extend laterally from the guide body. The upper guide finger slopes upward as the guide finger extends laterally away from the guide body. The lower guide finger slopes downward as the guide finger extends laterally away from the guide body. Due to the slopes of the guide fingers, the height of the guide aperture between the guide fingers increases as the guide fingers extend laterally away from the guide body.

A guide bearing is also secured to the guide body. The guide bearing is mounted within the guide aperture. If the belt travels too close to the guide body, the guide bearing contacts the belt. The movement of the bearing reduces the amount of wear and tear on the belt. Instead of the belt rubbing against a stationary piece, the belt contacts the bearing thus reducing friction.

Other objects, features, and advantages of the invention will be apparent from the following detailed description taken in connection with the accompanying drawings.

It is an object of the present invention to maintain the belt within the central portion of the conveyor assembly.

Another object of the present invention is to direct the belt towards the central portion of the conveyor assembly if the belt tracks off center.

Another object of the present invention is to provide a less costly tracking guide.

Another object of the present invention is to reduce the downtime of a conveyor system.

Another object of the present invention is to allow for the trouble free operation of the conveyor assembly.

Another object of the present invention is to simplify the installation of the guide.

Another object of the present invention is to increase the life of the belt.

In addition to the features and advantages of the belt tracking device and system according to the present invention, further advantages thereof will be apparent from the following description in conjunction with the appended drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
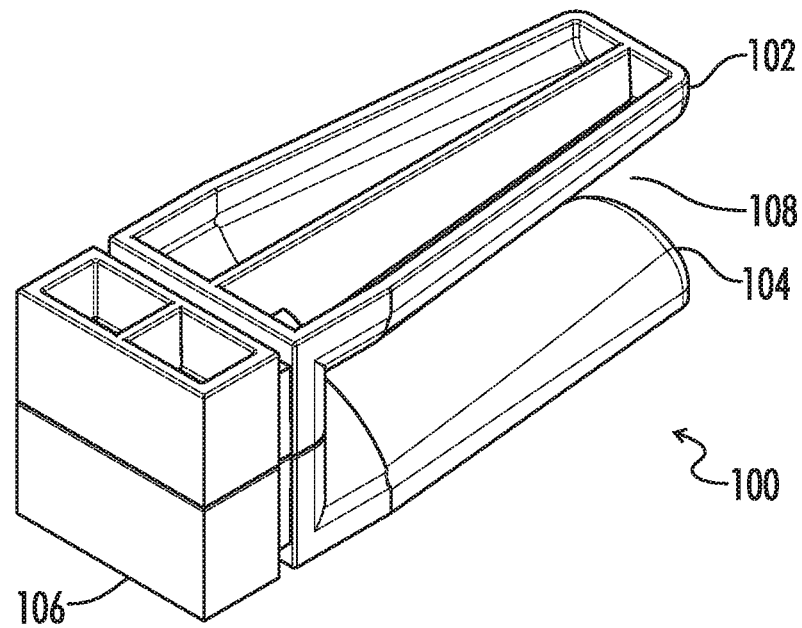
FIG. 1 is a top perspective view showing one embodiment of the present invention.

Referring to FIGS. 1-7, the belt guide of the present invention is generally illustrated by reference numeral 100. The belt guide of one embodiment is constructed from a rigid to semi-rigid material, including but not limited to plastic or metal. The belt guide 100 secures to rails of a conveyor system. The belt travels along a longitudinal axis to transport objects along the belt pathway.

As the belt transports objects longitudinally, the belt occasionally tracks laterally to the left and/or right. The belt guide 100 directs the belt to the center to avoid continued lateral movement. The belt guides 100 are installed on the rails located laterally of the belt. The belt travels between the rails and the belt guides 100.

Figure 2:
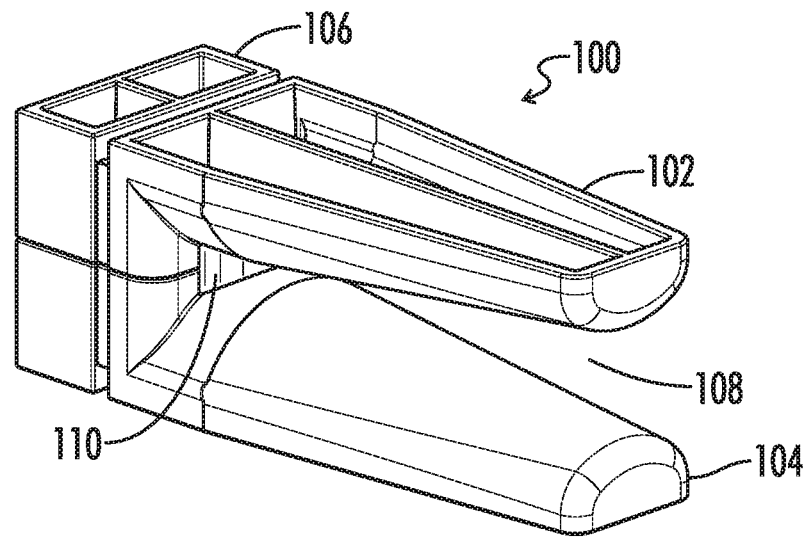
FIG. 2 is a top perspective view thereof.
Figure 6:
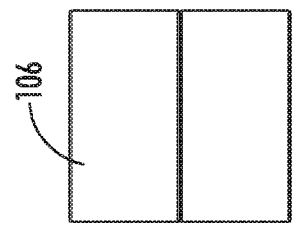
FIG. 6 is a right side view thereof.
Figure 3:
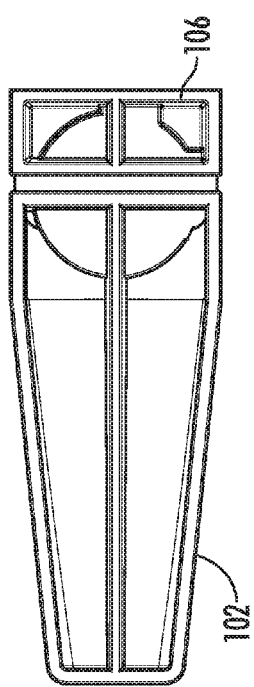
FIG. 3 is a top view thereof.

A top guide finger 102 and bottom guide finger 104 of the guide 100 contacts the belt to direct the belt laterally away from the guide body 106. The guide fingers 102, 104 provide a contact surface for the belt to contact the guide 100. The contact surfaces are at least partially rounded as shown in FIGS. 1 and 2. The rounded shape of the contact surfaces reduces sharp corners that can damage the belt. The contact surfaces of the guide fingers 102, 104 slope away from the guide body 106 to direct the belt away from the guide body 106.

Figure 5:
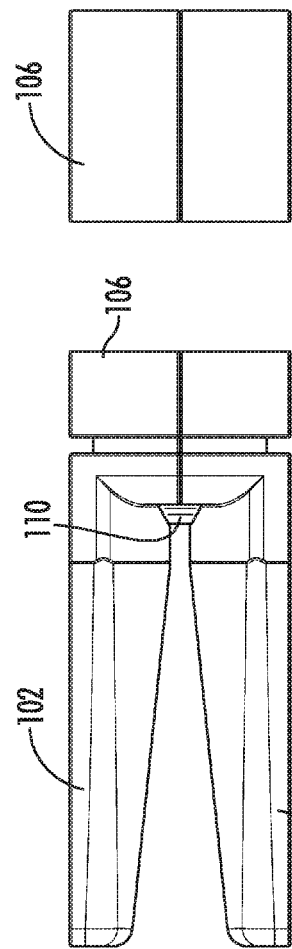
FIG. 5 is a front view thereof.
Figure 7:
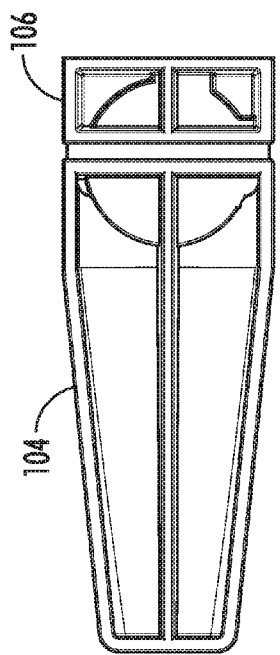
FIG. 7 is a bottom view thereof.

The contact surface of the top guide finger 102, as shown in FIGS. 1, 2, and 5, slopes upward from the guide body 104 laterally inwards towards the belt pathway. Similarly, the contact surface of the bottom guide finger 104 slopes downward from the guide body 104 laterally inwards towards the belt pathway.

Top guide finger 102 and bottom guide finger 104 form the guide aperture 108. The belt travels through the guide aperture 108 longitudinally along the belt pathway. The height of the guide aperture 108 increases laterally away from the guide body 106 towards the termination of the guide fingers 102, 104. The guide aperture 108 provides an opening end that allows for easy installation of the belt within guide aperture 108.

Figure 4:
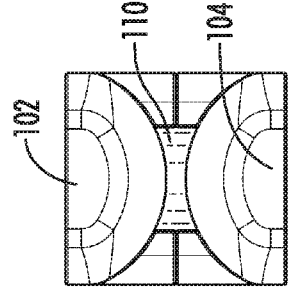
FIG. 4 is a left side view thereof.

FIGS. 2, 4, and 5 show the bearing 110 mounted within the guide body 106. The bearing 110 reduces the friction of the belt against guide body 106 as the belt travels through the guide aperture 108. The reduction in friction caused by bearing 110 reduces damage to the belt. If the belt tracks laterally outward towards guide body 106, the bearing 110 facilitates the travel of the belt through the guide aperture 108 until the belt is redirected to the desired position.

Figure 8:
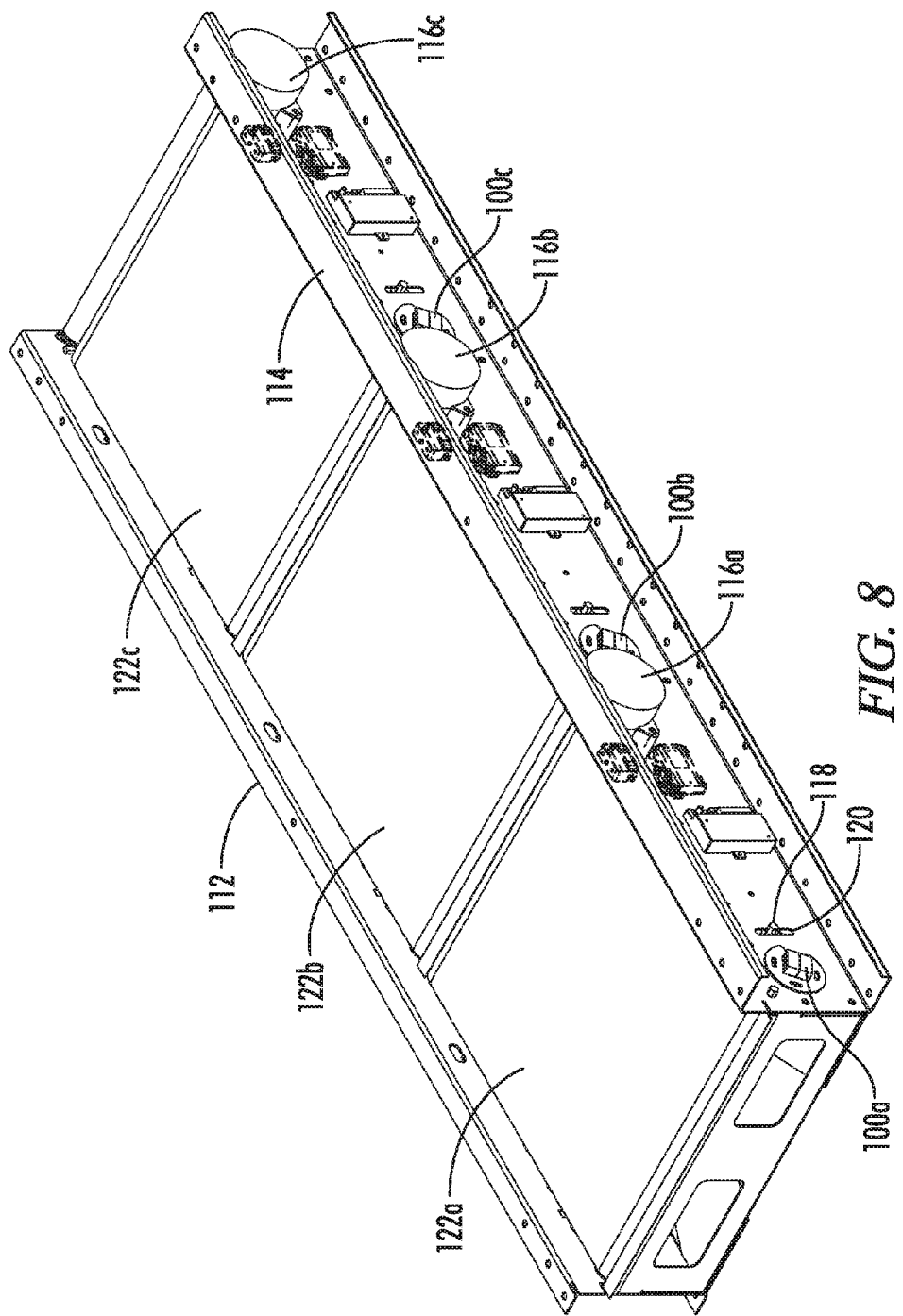
FIG. 8 is an environmental view of one embodiment of the present invention.
Figure 9:
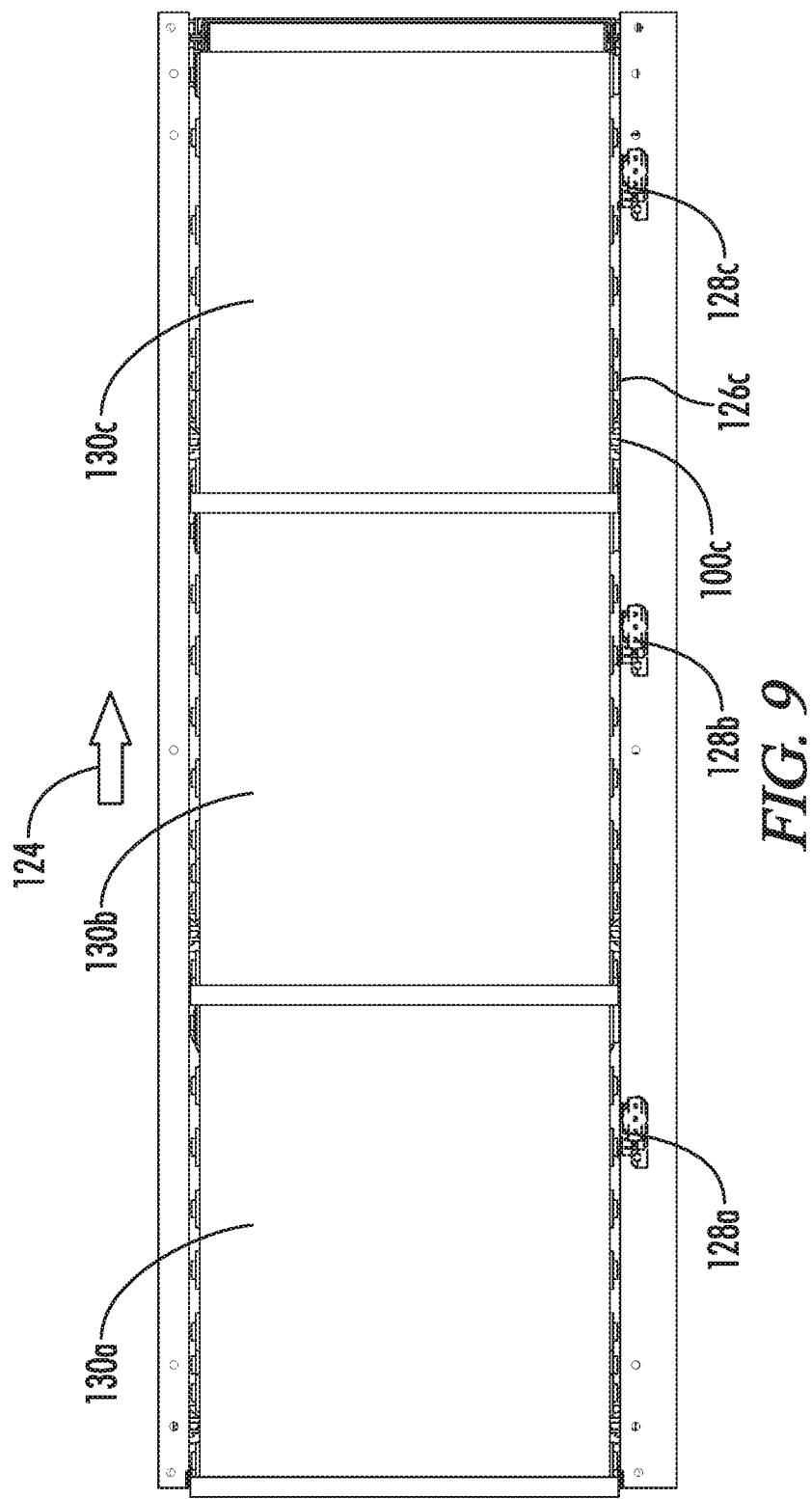
FIG. 9 is an environmental view thereof.

FIGS. 8 and 9 show an environmental view of the guide 100 secured to the rails 112, 114. A belt guide 100 is secured to each rail 112, 114. Belts 122a, 122b, 122c travel through the guides 100a, 100b, 100c to reduce lateral tracking of the belt 122 towards rails 112, 114.

The conveyor system may function with multiple guides 100a, 100b, 100c, multiple belts 122a, 122b, 122c, and multiple motors 116a, 116b, 116c. In one embodiment as shown in FIG. 9, the conveyor system provides three zones 130a, 130b, 130c. Each zone 130a, 130b, 130c provides at least one motor, a guide on each rail for a total of two guides per belt, a tensioning roller, a belt, and a sensor.

The motors 116a, 116b, 116c and the belts 122a, 122b, 122c transport objects along the belt pathway 124 across the conveyor system through the different zones 130a, 130b, 130c. Sensors 128a, 128b, 128c activate the motors 116a, 116b, 116c for each zone 130a, 130b, 130c.

Figure 10:
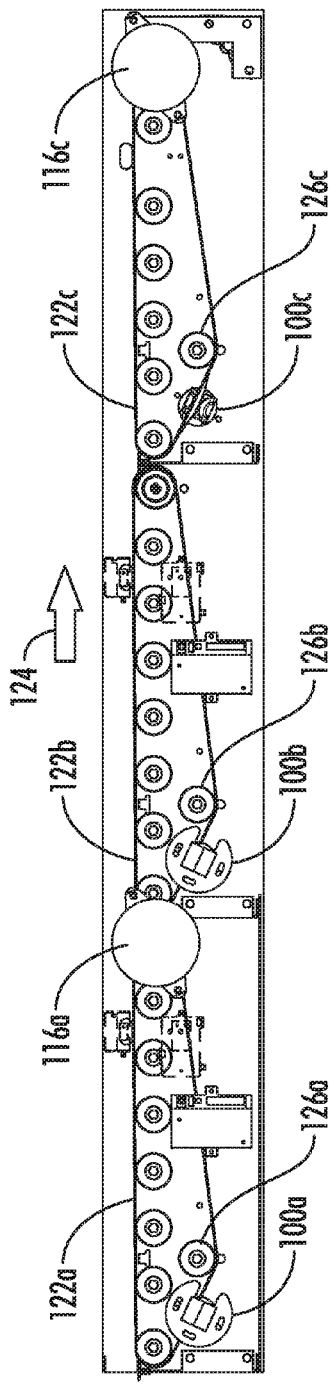
FIG. 10 is a sectional view thereof.

Referring to FIGS. 8 and 10, each zone 130a, 130b, 130c provides a tensioning roller 126. The weight of the tensioning roller 126 tensions the belt of each zone. The weight of the tensioning roller 126 is selected by the amount of downward force needed to be applied to the belt. If additional force is needed, a spring or other biasing device may be applied to the tensioning roller 126 to exert additional downward force on the belt. The tensioning roller 126 is secured to the rails 112, 114 at tensioning aperture 120. Tensioning aperture 120 provides a vertical opening that enables the positioning of tensioning roller 126 to adjust vertically. The attachment finger 118 of the tensioning roller 126 inserts into the tensioning aperture 120. The tensioning aperture 120 and attachment finger 118 limits the longitudinal movement of the tensioning roller along the belt pathway 124.

Figure 11:
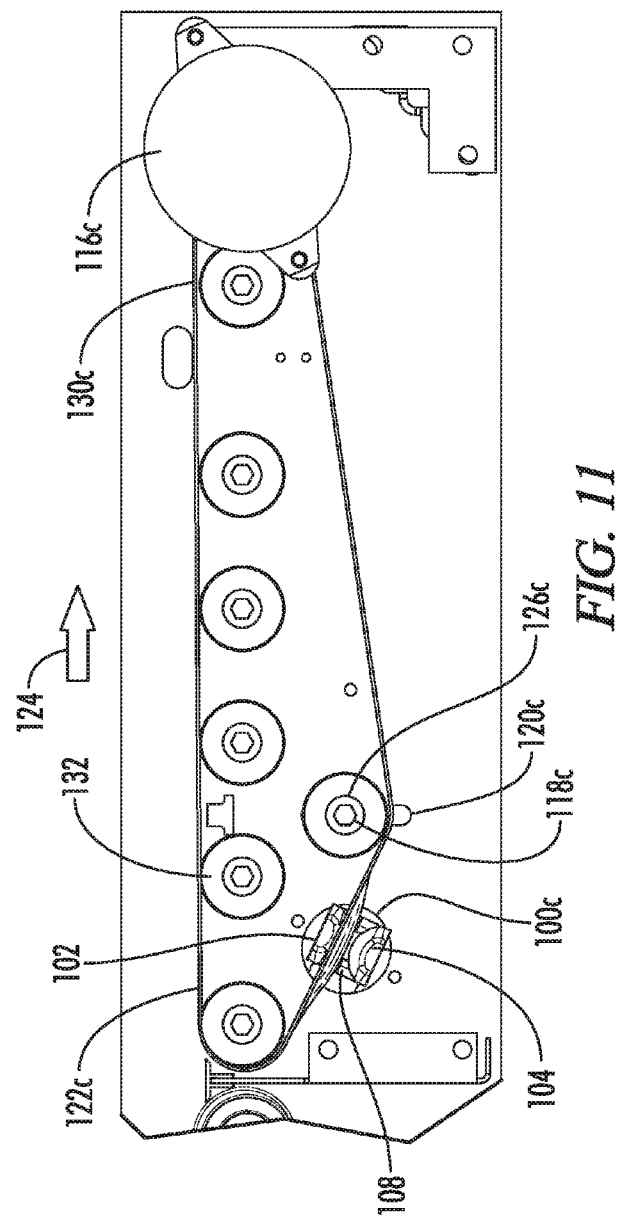
FIG. 11 is a sectional view thereof.

FIGS. 10 and 11 show a sectional view of the conveyor system. Each belt travels across rollers 132. Each belt 122a, 122b, 122c is tensioned by the tensioning roller 126a, 126b, 126c. The attachment finger 118c secures into tensioning aperture 120c to limit the tensioning roller 126c from longitudinal movement along the belt pathway 124. As indicated above, the tensioning aperture 120c enables vertical movement of the tensioning roller 126c for appropriately tensioning the belt. Guide 100c is positioned to accept belt 122c. The belt 122c travels longitudinally through the guide aperture 118 on its return. Motor 116c applies force to rotate the roller and the belt 122c as will be described below.

Figure 12:
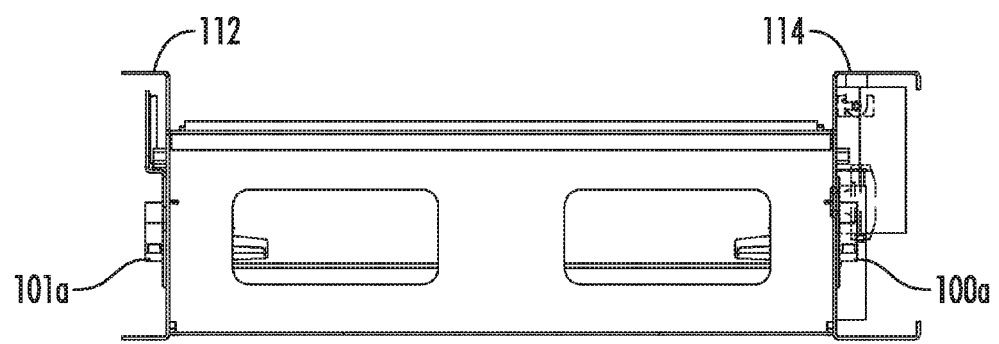
FIG. 12 is an environmental view thereof.

FIG. 12 shows the belt guides 100a and 101a installed on the rails 112, 114. The guides 100a, 101a are located opposite each other along rails 112, 114. Each guide directs the belt laterally away from the guide if the belt tracks close enough to contact the guide. The slope of the guide fingers increases the contact with the guides as the belt tracks off course towards the guides. The increased contact of the belt with the guides directs the belt away from the guide. A guide is needed on each rail to direct the belt if the belt should track towards either rail.

Figure 13:
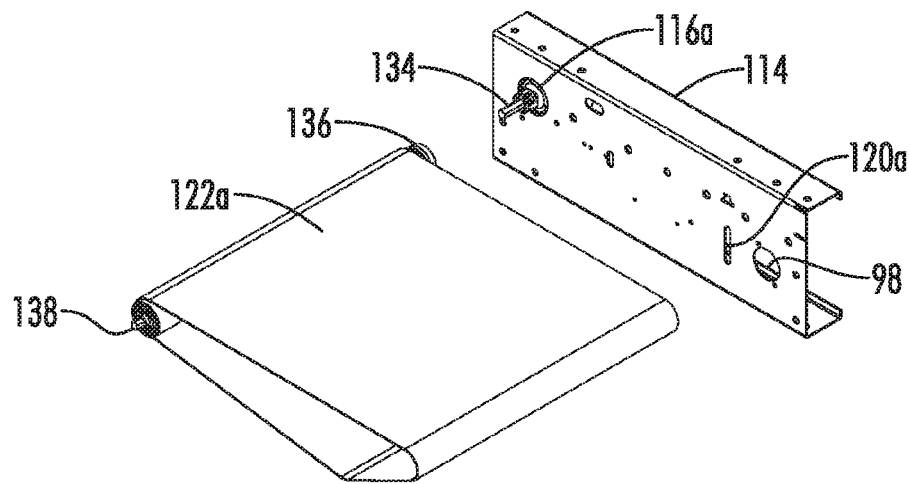
FIG. 13 is an exploded view of one embodiment of the present invention.
Figure 14:
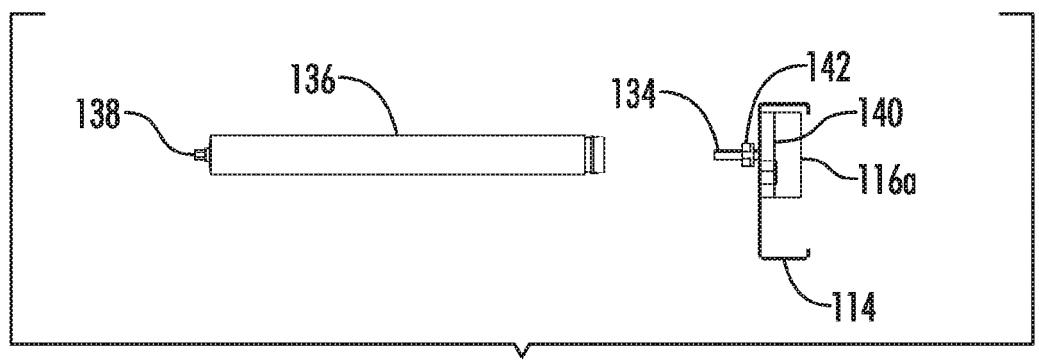
FIG. 14 is an exploded view thereof.
Figure 15:
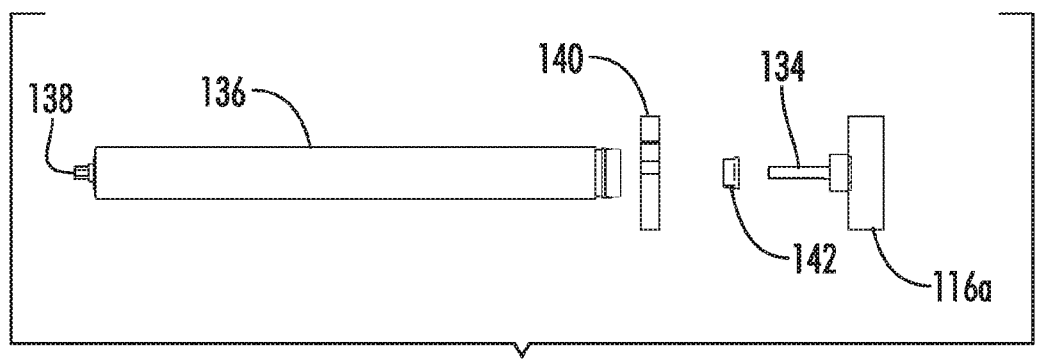
FIG. 15 is an exploded view thereof.

FIGS. 13-15 show the motor 116*a* with drive roller 136. Shaft 134 of the motor 116*a* drives the drive roller 136. Drive roller 136 contacts belt 122*a* to drive the roller 122*a* along the belt pathway. Motor aperture within rail 114 enables an external mount of the motor 116*a*. In another embodiment, the motor may be internally mounted on the rail. Rail 114 also provides tensioning aperture 120 for securing the tensioning roller. Rail 114 also provides installation aperture 98 for installing the belt guide.

Shaft 134 with coupling 142 inserts into the drive roller 136. The coupling 142 secures the shaft 134 to the roller to drive the roller 136. Spacer block 140 installs adjacent rail 114 for placement of motor 116*a* adjacent the rail 114 and securing the motor 116*a* to the rail 114.

Motor 116*a* rotates shaft 134 and coupling 142 causing rotation of the drive roller 136. Friction between the drive roller 136 and belt 122 drives the belt 122*a* as the roller 136 rotates. Attachment finger 138 of the drive roller 136 secures to the opposite rail to secure the driver roller 136 to the conveyor system.

Figure 16:
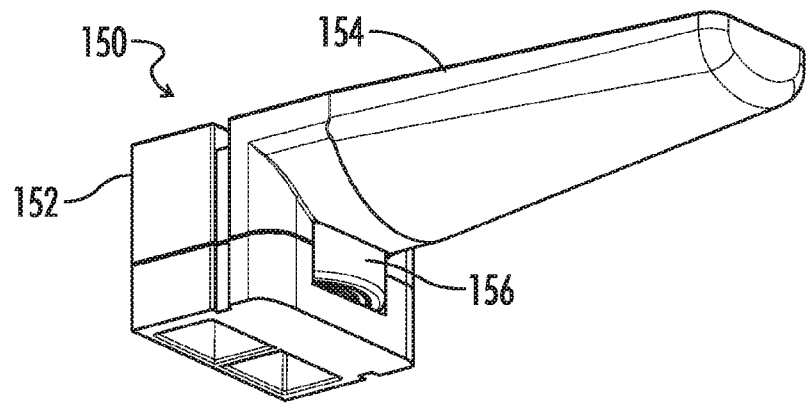
FIG. 16 is a perspective view of one embodiment of the present invention.

FIG. 16 shows another embodiment of the belt guide 150. The belt guide 150 provides a similar guide body 152 from which guide finger 154 extends. Guide finger 154 provides a rounded contact surface for contacting the belt to guide the belt away from the guide body 152. Guide 150 provides a single guide finger 154 instead of two guide fingers as described above.

The belt travels longitudinally along the belt pathway. The belt guide 150 is positioned laterally across the belt pathway should the belt track off center. The belt guide 150 contacts the belt to redirect the belt away from the belt guide 150. Guide finger 154 functions similarly to the guide fingers described above.

Belt guide 150 also provides a bearing 156. Similar to the bearings described above, bearing 156 reduces friction between the belt and guide body 152 should the belt track too close to the belt guide 150.

Figure 17:
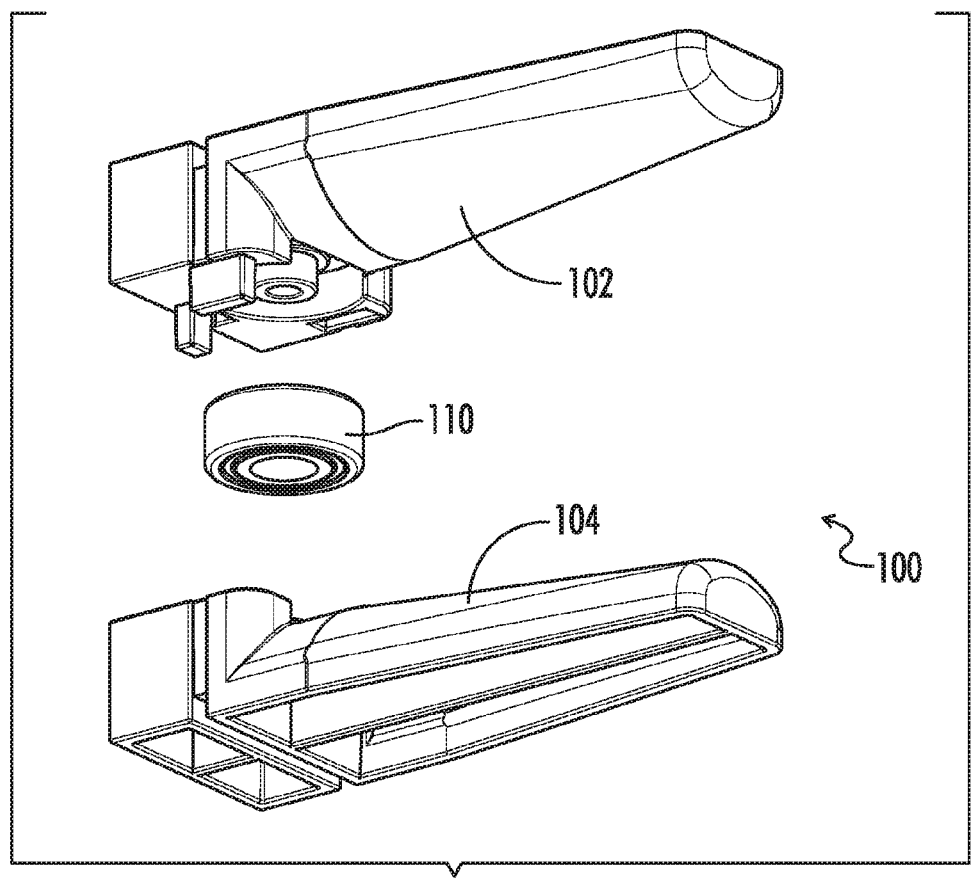
FIG. 17 is an exploded view thereof.

FIG. 17 shows an exploded view showing placement of bearing 110 between guide fingers 102, 104. The bearing 110 reduces friction between the belt and the guide 100. The reduced friction extends the life of the belt and reduces damage to the belt.

Figure 18:
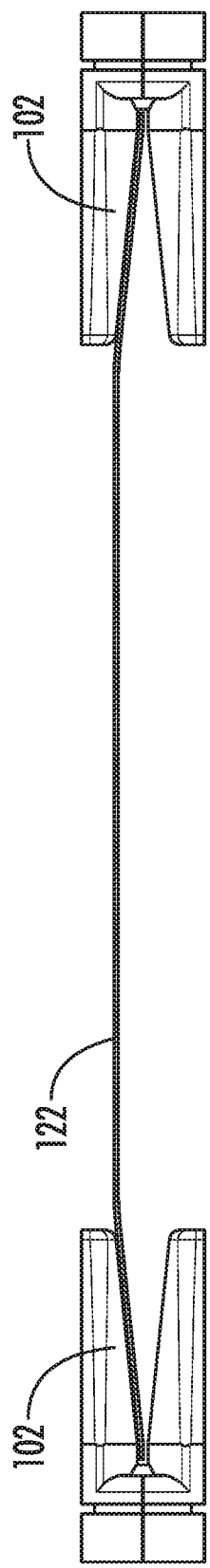
FIG. 18 is partial environmental view of one embodiment of the present invention.

FIG. 18 shows the belt 122 traveling between guides 100, 101. The belt 122 travels within guide apertures 108, 109 of the guides 100, 101. The belt contacts guide fingers 102, 103 when returning to the front of the conveyor zone. The contact of the belt with the guide fingers 102, 103 centers the belt on the conveyor to reduce lateral travel of the belt.

In one embodiment, the belt guides are installed such that the belt guides are transverse to the longitudinal axis of the belt pathway. In another embodiment, the belt guides are located laterally of the belt pathway to enable the belt guides to contact the belt and direct the belt away from the belt guide.

In one embodiment, the belt guide has a height of 1 inch to 4 inches, preferably 1 and 7/16 inches. The belt guide of such an embodiment has a width of 2 inches to 7 inches, preferably 3 and 7/8 inches. The belt guide of such an embodiment has a depth of one inch to 4 inches, preferably 1 and 3/8 inches. The belt guide of such an embodiment has an angle of 8 to 20 degrees, preferably 11.8 degrees between the lowest contact surface of the upper guide finger and the upper contact surface of the lower guide finger. The size of the belt guide and the angle of the contact surfaces of the guide fingers may vary according to the needs and size of the conveyor system.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A belt tracking guide configured to contact a belt of a conveyor system wherein the belt guide directs the belt to return to a belt pathway between the rails of a conveyor system, the guide comprising:
    a guide body that mounts to the conveyor system;
    an upper guide finger extending laterally away from the guide body, the upper guide finger extending towards the belt pathway of the belt;
    a lower contact surface of the upper guide finger located on a bottom surface of the upper guide finger, the lower contact surface sloping upwards from the guide body towards the belt pathway; and
    a bearing located vertically below the lower contact surface of the upper guide finger wherein the bearing rotates independently of the upper guide finger.

2. The guide of claim 1 wherein the belt travels below the upper guide finger.

3. The guide of claim 1 further comprising:
    a lower guide finger extending laterally away from the guide body, the lower guide finger extending towards the belt pathway of the belt;
    an upper contact surface of the lower guide finger located on a top surface of the lower guide finger, the upper contact surface sloping downwards from the guide body towards the belt pathway.

4. The guide of claim 3 further comprising:
    a guide aperture located between the upper contact surface of the lower guide finger and the lower contact surface of the upper guide finger where the belt travels through the guide aperture.

5. The guide of claim 4 wherein the height of the guide aperture increases as the upper guide finger and the lower guide finger extend laterally away from the guide body.

6. The guide of claim 5 wherein the guide aperture terminates at the guide body.

7. The guide of claim 6
    wherein the bearing is located at the termination of the guide aperture, the bearing rotates in the direction of a pathway travelled by the belt to reduce friction of the belt rubbing against the guide body.

8. The guide of claim 1 wherein the lower contact surface is at least partially rounded.

9. The guide of claim 3 wherein the upper contact surface is at least partially rounded.

10. The guide of claim 9 wherein the lower contact surface is at least partially rounded.

11. A belt tracking guide system configured to contact a belt of a conveyor system wherein the belt guide directs the belt to return to a belt pathway between the rails of a conveyor system, the guide comprising:

a guide body that mounts to the conveyor system;
an upper guide finger extending laterally away from the guide body, the upper guide finger extending towards the belt pathway of the belt;
a lower contact surface of the upper guide finger located on a bottom surface of the upper guide finger, the lower contact surface sloping upwards from the guide body towards the belt pathway; and
a bearing located vertically below the lower contact surface of the upper guide finger wherein the bearing rotates freely in relation to the upper guide finger, wherein the bearing is exposed for contacting the belt wherein the bearing rotates in the direction of a pathway travelled by the belt.

12. The system of claim 11 further comprising:
a tensioning roller attached to the rails wherein the tensioning roller rests upon the belt wherein the attachment of the tensioning roller to the rails allows vertical movement of the tensioning roller.

13. The system of claim 12 further comprising:
a lower guide finger extending laterally away from the guide body, the lower guide finger extending towards the belt pathway of the belt;
an upper contact surface of the lower guide finger located on a top surface of the lower guide finger, the upper contact surface sloping downwards from the guide body towards the belt pathway.

14. The system of claim 13 further comprising:
a guide aperture located between the upper contact surface of the lower guide finger and the lower contact surface of the upper guide finger where the belt travels through the guide aperture.

15. The system of claim 14 wherein the height of the guide aperture increases as the upper guide finger and the lower guide finger extend laterally away from the guide body.

16. The system of claim 15 wherein the guide aperture terminates at the guide body;
the bearing located at the termination of the guide aperture between the upper guide finger and the lower guide finger wherein the bearing reduces friction of the belt rubbing against the guide body.

17. The system of claim 13 wherein the lower contact surface is at least partially rounded and the upper contact surface is at least partially rounded.

* * * * *